United States Patent [19]
Mihic

[11] 3,959,861
[45] June 1, 1976

[54] CLAMPING ARRANGEMENT FOR A CUTTING TOOL

[76] Inventor: Wlajko Mihic, Tegnervagen 9, Gavle, Sweden

[22] Filed: Apr. 18, 1975

[21] Appl. No.: 569,426

Related U.S. Application Data

[63] Continuation of Ser. No. 355,378, April 30, 1973, abandoned.

[30] Foreign Application Priority Data

Apr. 28, 1972 Sweden.............................. 5666/72

[52] U.S. Cl. .................................................. 29/96
[51] Int. Cl.² ........................................... B26D 1/00
[58] Field of Search ......................................... 29/96

[56] References Cited
UNITED STATES PATENTS

| | | | |
|---|---|---|---|
| 2,395,570 | 2/1946 | McKenna.............................. | 29/96 |
| 2,449,823 | 9/1948 | Sheridan.............................. | 29/96 |
| 3,316,616 | 5/1967 | Milewski.............................. | 29/96 |

FOREIGN PATENTS OR APPLICATIONS

| | | | |
|---|---|---|---|
| 595,420 | 12/1947 | United Kingdom..................... | 29/96 |

Primary Examiner—Othell M. Simpson
Assistant Examiner—W. R. Briggs
Attorney, Agent, or Firm—Sughrue, Rothwell, Mion, Zinn & Macpeak

[57] ABSTRACT

A clamping arrangement for securing a cutting bit insert in a tool holder. The bit is held by an elongated lever like clamp that pivots on one end and is urged down against the bit by a retaining screw, the bit and clamp are accomodated within an inwardly sloping recess in the tool holder, and the parts are dimensioned such that the top of the clamp lies below the imaginarily extended surface of the tool holder, whereby hot cut chips from the workpiece are prevented from contacting and damaging the clamps.

2 Claims, 8 Drawing Figures

CLAMPING ARRANGEMENT FOR A CUTTING TOOL

This is a continuation of application Ser. No. 355,378, filed Apr. 30, 1973, now abandoned.

BACKGROUND OF THE INVENTION

1. Field of the Invention

The present invention relates in general to a cutting tool, and particularly to a cutting tool of the type where an insert is secured in a toolholder by means of a clamping device, the latter consisting of a suitable lever-like body together with at lease one screw that screws into the toolholder. The main characteristic of the invention is that the body of the clamp is recessed relative to the insert in order to prevent or hinder chips cut by the insert from coming into contact with the clamp body.

2. Description of the Prior Art

In previously known cutting tools the arm-like body of the clamping device has been relatively large and designed to project markedly beyond the cutting insert or bit in order to secure the insert between the clamp body, or a nose on the latter and the seat of the insert. The clamp body then acts as a chip breaker, since chips separated or machined off the workpiece by the insert are led against the clamp body and broken off by it. However, this has proven to be disadvantageous because chips can get very hot while being separated from the workpiece. As a result, the clamp body is exposed to thermal stresses when the chips come into intimate contact with it, and these stresses can deform or ruin it.

SUMMARY OF THE INVENTION

In accordance with the present invention the body of the clamp is recessed relative to the insert, which eliminates or reduces the risk of chips coming into intimate contact with the body and causing thermal stresses in it.

DESCRIPTION OF THE PREFERRED EMBODIMENTS

Figure 1:
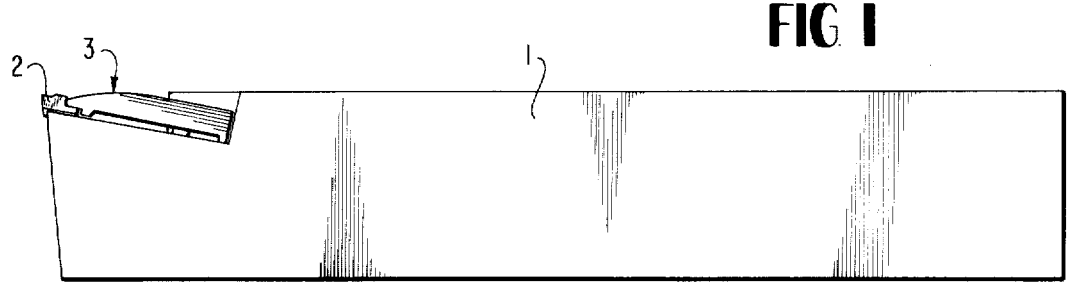
FIG. 1 is a side view of a cutting tool designed according to this invention.
Figure 2:
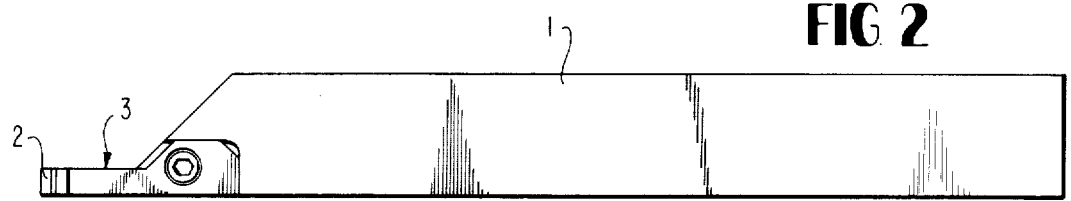
FIG. 2 is a top view of the same tool.
Figure 3:
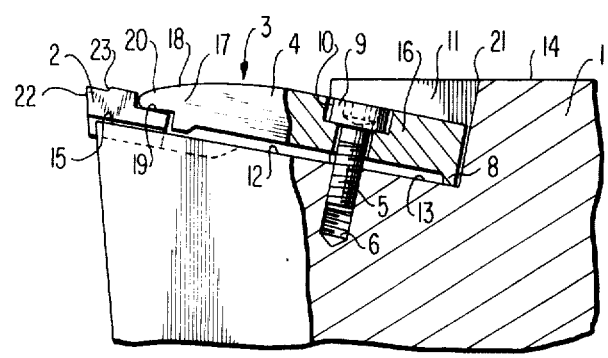
FIG. 3 is an enlarged section of part of the cutting tool shown in FIG. 1.

In FIGS. 1 through 3, 1 represents a toolholder or basic frame to which is removably attached an insert 2. To secure insert 2 relative to the toolholder, there is provided a clamping device 3 which consists of a lever-like body 4 and a clamp screw 5. This clamp screw screws into a threaded hole 6 in toolholder 1 and passes through hole 7 in body 4. Hole 7 and therefore also screw 5 are located at a distance from a small projection 8 underneath body 4. When screw 5, whose head 9 rests on a recessed seat 10 in body 4, is tightened the body 4 acts as a lever. In so doing, it forces insert 2 hard against the toolholder.

In accordance with the principles of this invention, the aforesaid lever-like body 4 is recessed relative to insert 2 in order to prevent or hinder chips machined off the workpiece by the insert from coming into contact with the clamp body.

In this particular example, toolholder 1 contains a recess 11 that accommodates insert 2 and clamp body 4. The bottom 12 of this recess extends obliquely upwards from a point 13 located relatively deeply below the upper surface or top plane 14 of toolholder 1, up to a point 15 located beneath plane 14 at a depth that is considerably less than the depth of point 13. This arrangement locates insert 2 at a comparatively high or peripheral position relative to clamp body 4. Moreover, body 4 is long, e.g. at least 3 to 7 times as long as it is thick, or, more preferably 4 to 6 times as long as it is thick, so that the body has a slender shape. In the example shown, body 4 comprises two different sections — a lower base-type section 16 whose upper and lower surfaces are parallel, and a section 17 whose upper surface 18 is more or less arched. Section 17 thus converges towards insert 2.

A special feature of this invention is the recess 19 made in insert 2 in order to accommodate a nose 20 on body 4. Because nose 20 on body 4 fits into a recess in the insert in this manner, because section 17 converges or gets narrower as described, and because the bottom 12 of recess 1 slopes upwards and outwards, that part or surface of the clamp body, in this case, arches surface 18, which is uppermost referred to the bottom of the recess will be located below an imaginary line extending from the upper part of insert 2 to upper edge 21 that bounds recess 11.

In the immediate vicinity of the wear-resistant cutting surface 22 of insert 2 in the version shown in this example, there is a shoulder 23 which acts as a chipbreaker.

Due to the fact that clamp body 4 is recessed relative to the insert in accordance with this invention, and due to the fact that the insert itself is provided with a chipbreaker shoulder, chips removed from the workpiece will not come into intimate contact with the clamp body. Chips that have already broken off may possibly come into temporary contact with the clamp body, but they cannot be forced against the latter and become welded to it.

Figure 4:
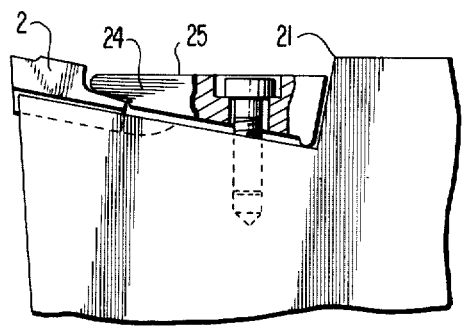
FIGS. 4 through 8 are views like that shown in FIG. 3 but showing alternate embodiments of the invention.

FIG. 4 shows a version where the clamp body 24 is essentially wedge-shaped and designed to secure insert 2. In this case, top surface 25 of the clamp body is located considerably below an imaginary line extending from the top part of insert 2 to the boundary edge 21.

In both of the versions shown thus far, insert 2 is provided, in a manner that in itself is already known, with transverse bottom serrations that engage mating V-shaped grooves in the toolholder, thus guiding and securing the insert adequately in the lateral direction.

Figure 5:
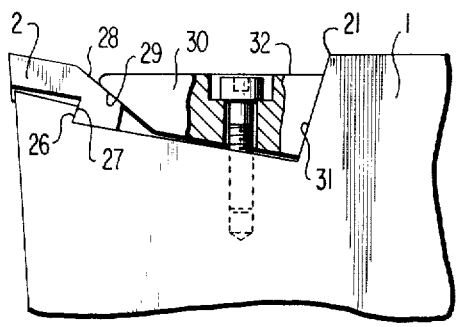

FIG. 5 shows a version of this invention where the location of insert 2 is determined not only by V-shaped serrations and mating grooves in the toolholder, but also by a transverse dog or shoulder 26 on the toolholder that engages a mating shoulder 27 on the insert. In this version, the previously shown recess in the insert (see FIG. 3) is replaced by an inclinded surface 28 lying against a correspondingly oblique contact surface 29 on clamp body 30. In this case, clamp body 30 is designed so that insert 2 is forced into the position shown in FIG. 5 by the wedging effect of surface 28 of the insert and of an inclined surface 31 on the toolholder. In this case too, the upper surface 32 of clamp body 30 is located well below an imaginary line extending from the top part of insert 2 to boundary edge 21.

Figure 6:
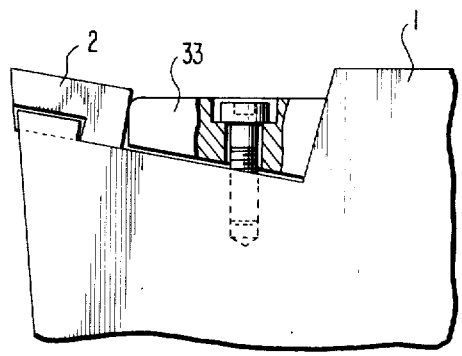

FIG. 6 also illustrates a version of this invention in which clamping device 33 operates as a wedge between insert 2 and a sloping surface on toolholder 1.

Figure 7:
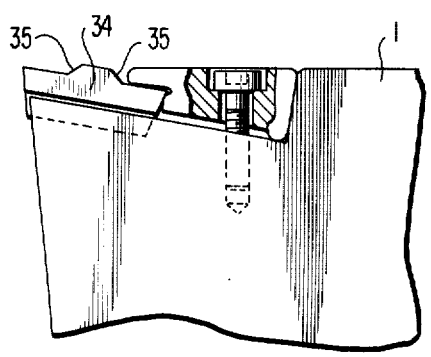

Finally, FIG. 7 illustrates a version of the principles set forth in this invention, applied to a multi-edged insert which bears two chipbreaker shoulders 35 located opposite each other.

Figure 8:
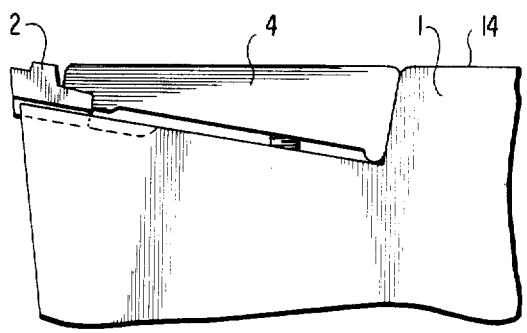

FIG. 8 illustrates a version similar to that shown in FIGS. 1 through 3. Here, however, clamp body 4 is essentially wedge-shaped so that its top surface lies in the same plane as — or possibly somewhat below — the top surface 14 of the toolholder.

The advantages of this invention are evident, since the clamping device provides to secure the inserts are not exposed to troublesome thermal stresses which could otherwise deform and ruin them.

This invention is not limited to the versions described and shown in the drawings. Consequently, the geometrical shape of the clamp body, as well as the design of the insert, can vary within relatively wide limits without departing from the principles on which this invention is based.

I claim:

1. In a cut-off tool of the type wherein a narrow cutting bit having a V shaped protrusion on a bottom portion is clamped in a recess having a V shaped notch extending parallel to the longitudinal axis of the tool to engage the protrusion, at one end of a relatively narrow supporting portion extending from the upper surface of the tool holder, said supporting portion and said recess being defined by a lower wall extending inwardly and downwardly along the longitudinal axis of the tool holder at an acute angle with a plane defined by the top surface of said tool holder and a rear wall extending from said lower wall to the top surface of said tool holder approximately perpendicular to said lower wall, the improvements comprising:

a. a lever like body having a fulcrum point on one end, said fulcrum contacting said lower wall of said recess in said tool holder, and the opposite end engaging a notch in said cutting bit, said opposite end having substantially the same width as the cutting bit and said end having the fulcrum point having a greater width than said opposite end, said lever like body having a length of at least three times the width of said opposite end and is disposed in said recess such that its uppermost portion is below the upper most portion of said cutting bit and below the plane containing the upper surface of said tool holder, and b. threaded means engaging said lever like body intermediate its fulcrum and opposite ends and threadingly engaged with said tool holder in said recess to cause said body to tend to pivot about its fulcrum point, thereby causing said opposite end to exert a normal force on said cutting bit and clamp said bit in the tool holder recess.

2. The improved clamping means of claim 1 wherein the upper surface of said lever like body is arcuate between said one end and said opposite end.

* * * * *